June 27, 1933.   G. H. WINGATE   1,915,707
SPECTACLE FRAME
Filed March 28, 1929
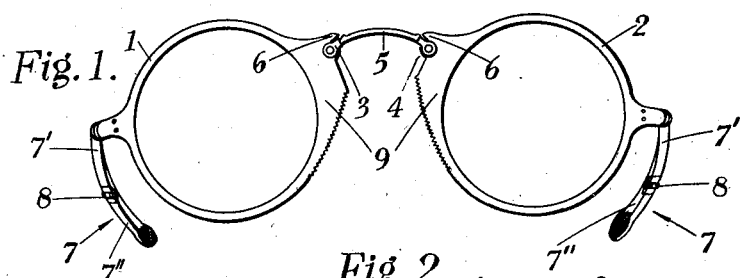
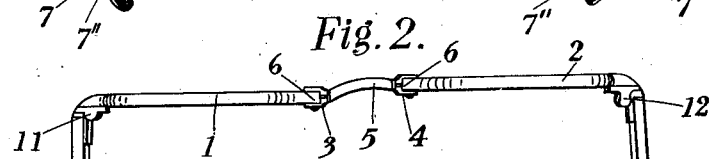
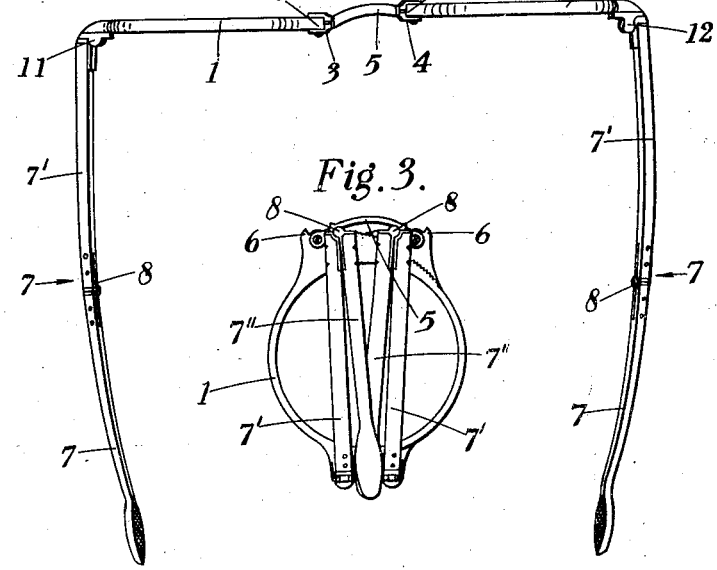
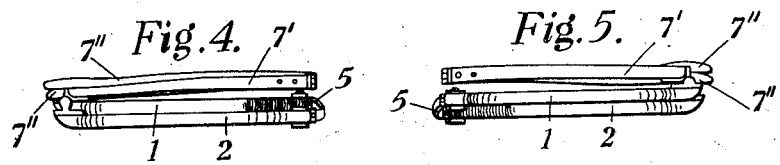
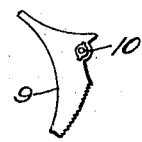
INVENTOR
G.H.WINGATE
BY
ATTORNEY Patented June 27, 1933

1,915,707

UNITED STATES PATENT OFFICE

GERALD HENRY WINGATE, OF LONDON, ENGLAND

SPECTACLE FRAME

Application filed March 28, 1929, Serial No. 350,725, and in Great Britain October 26, 1928.

This invention relates to folding spectacles and has for its principal object to provide spectacles which are neat in appearance and comfortable to wear, and at the same time can be folded away into a particularly compact form.

Other objects are to enable eyes of tortoise-shell or other non-metallic material to be pivotally attached to a bridge in a durable manner, to shape the eyes in a manner giving a firm seating upon the wearer's face, to provide in folding spectacles sides adapted to grip the wearer slightly without distortion of the main part of the frames, and generally to provide the novel combinations, arrangements and features embodied in the preferred forms which it is now proposed to describe in order to render the nature of the invention clear.

These preferred forms are illustrated by the accompanying drawing, wherein:—

Fig. 1 is a front view of a pair of spectacles,
Fig. 2 is a plan view of the same,
Fig. 3 is a back view of the same folded,
Fig. 4 is a view of the parts as shown at Fig. 3 when viewed from the right,
Fig. 5 is a similar view when viewed from the left.
Fig. 6 a detail of the eyes shown in the other figures.

As illustrated the eyes 1, 2 of the spectacles are pivotally connected to the forks 3, 4 formed at the ends of a bridge 5 of simple curvature. The bridge 5 is preferably slightly springy. It is to be observed that the forks are slightly offset relatively to one another so as to bring the plane of the front of the eye 1 substantially into that of the back of the eye 2. An abutment 6 upon each eye bears upon the bridge just above the fork when the spectacles are open. The sides 7 are pivoted to the eyes and in addition at approximately their centres each side has a hinge joint 8, the hinge being below so that the severed ends of the sides abut when open, the sides being thus formed of two limbs $7^1$ and $7^{11}$.

The material of the eyes is widened at 9, 9 and may be roughened slightly as indicated. The margins of the eyes are in this way caused to continue to converge considerably above the centres of the lenses so as to rest or grip lightly upon the nose of the wearer.

It will be understood that when in the open position the spectacles are practically of normal appearance, but that when they are closed the two eyes lie one directly upon the other, and the folded sides are not substantially longer than the eye 1 against which they lie. It is desirable that the attachment of the side to one of the eyes should leave sufficient space for the other eye when folded so that both the sides lie at substantially the the same level upon the top of the last named eye. For this purpose the hinge 11 is set closely to the eye 1, but hinge 12 is sufficiently set back from the eye 2.

It will be understood that where tortoiseshell or other light non-metallic material is used for the eyes it is undesirable to subject it to the wear caused by relative rotation against the metal forks. To avoid this the construction shown at Fig. 6 is adopted, a metal bushing 10 with one or more projections or of non-circular cross-section (to prevent rotation) being firmly pressed or cemented into a corresponding hole formed through the tortoise-shell or like of the eye. In this manner the rotary bearing and the thrust surfaces at the pivoted joints are all metallic.

In order that the sides when folded may not interfere with one another in the folding of the spectacles, each folded side must lie in a plane above the center of its own eye. That is to say, the folding joint of each side when lying against its own eye must be in such relation to the pivot between that eye and the bridge that no part of the folding joint lies at a greater perpendicular distance from the center of that pivot than a distance equaling half the length of the bridge. When thus arranged and the spectacles are folded, the sides each lie upon opposite sides of a center line drawn through the middle of the bridge. This is preferably accomplished by making each of the sides lie across its own eye at an upward inclination from the pivotal connection of that side to the eye.

I claim:—

1. In a pair of foldable spectacles, a bridge, eyes pivoted to said bridge on substantially parallel axes so that the front of one eye when folded lies substantially in the plane of the back of the other, means to limit upward movement of said eyes relatively to said bridge and sides pivoted to said eyes and provided themselves with two limbs joined by pivot joints adapted to limit the upward movement of the outer limbs and whereon they are foldable in a substantially vertical plane, so that the spectacles when folded lie substantially within the thickness of the two eyes plus that of one limb of the said sides, the second limb of each of the said sides lying alongside and substantially within the thickness of the first limb.

2. In a pair of spectacles according to claim 1, and having non-metallic eyes, metallic pieces immovably fixed relatively to the material of the eyes and affording metallic bearing surfaces at the pivotal joints between the bridge and the eyes.

3. In folding spectacles, a bridge piece, eyes connected to the bridge piece on substantially parallel pivots, the pivotal mounting being arranged to cause the eyes when folding to move in relatively offset planes to arrange the eyes when folded one immediately in rear of the other, sides pivotally connected to the eyes and each including a section next the eye and an outer section foldable with respect to the first mentioned section into a position beneath and in substantially vertical alignment with the first mentioned section, the connection of one of the sides to its eye being spaced farther from the eye than the connection of the other section to its eye, whereby when the eyes are folded the pivotal supports of the sides to the respective folded eyes is substantially in a single plane parallel to and spaced from one of the eyes, whereby to permit both folded sections to fold down onto the adjacent eye and into a single plane substantially parallel with that of the eye on which they are folded.

4. Folding spectacles including a substantially rigid bridge, a pair of eyes connected to the bridge on substantially parallel pivots, the pivotal mounting causing the eyes when folding to move in adjacent, substantially offset planes whereby the eyes when folded are arranged one in rear of the other in substantial coincidence, sides pivotally connected to the respective eyes, each side including an outer section movably connected for folding beneath and into a substantially vertical plane with the remaining portion of the side, the pivotal connection of one side to its eye being spaced from the eye a distance exceeding the similar spacing of the other side with relation to its eye by the thickness of one of the eyes, whereby when the eyes are folded the pivotal connections of the sides to the eyes are in substantially the same plane parallel to the plane of that eye beyond which the sides project, whereby to permit the sides to fold down equally and in substantially parallel relation onto the adjacent eye.

5. In a pair of foldable spectacles, a bridge, eyes pivotally connected to said bridge and moving when folding in substantially parallel planes, with the front of one eye in substantially the plane of the back of the other, sides pivotally connected to the eyes and each made up of two foldable sections, the sections being connected for folding to dispose the sections one above the other, one of the sides being pivotally connected comparatively close to one eye, the other of the sides being pivotally connected to the other eye and spaced therefrom in its pivotal mounting by a distance substantially equaling the thickness of the first mentioned eye, whereby when the eyes are folded the plane including the pivots of the sides is substantially parallel to the plane of the adjacent eye to thereby permit the sides to fold down upon said eye in substantially parallel planes.

6. In a pair of foldable spectacles, a bridge, eyes pivotally connected to said bridge and moving when folding in substantially parallel planes, with the front of one eye in substantially the plane of the back of the other, means to limit the upward movement of the eyes relative to said bridge, sides pivotally connected to the eyes and each made up of two foldable sections, the sections being connected for folding to dispose the sections one above the other, one of the sides being pivotally connected comparatively close to one eye, the other of the sides being pivotally connected to the other eye and spaced therefrom in its pivotal mounting by a distance substantially equaling the thickness of the first mentioned eye, whereby when the eyes are folded the plane including the pivots of the sides is substantially parallel to the plane of the adjacent eye to thereby permit the sides to fold down upon said eye in substantially parallel planes.

7. Folding spectacles including a bridge piece, eyes, pivots uniting the eyes to the bridge piece, the pivotal connection between the bridge piece and eyes compelling the eyes when closed into registry by turning about the pivots to lie in different parallel planes, with the back of one eye substantially in contact with the front of the other eye, sides pivotally connected to the eyes, the pivotal support of one of the sides being spaced from its eye a distance substantially corresponding to the thickness of the other eye, whereby when the eyes are folded in superimposed contacting relation, the sides may both fold onto and in contact with one of the eyes.

8. Folding spectacles including a bridge piece, eyes, pivots uniting the eyes to the bridge piece, the pivotal connection between the bridge piece and eyes compelling the eyes when closed into registry by turning about the pivots to lie in different parallel planes, with the back of one eye substantially in contact with the front of the other eye, sides pivotally connected to the eyes, the pivotal support of one of the sides being spaced from its eye a distance substantially corresponding to the thickness of the other eye, whereby when the eyes are folded in superimposed contacting relation, the sides may fold onto and in contact with one of the eyes, the pivotal connection of the respective sides compelling movement of a particular connected side in a direction upwardly from such pivotal connection toward the bridge, whereby the sides when folded may lie side by side on one of the eyes.

9. Folding spectacles including a bridge piece, eyes, pivots uniting the eyes to the bridge piece, the pivotal connection between the bridge piece and eyes compelling the eyes when closed into registry by turning about the pivots to lie in different parallel planes, with the back of one eye substantially in contact with the front of the other eye, a side pivoted to each eye, the pivotal connection of one of the sides to its eye being spaced from that eye a distance substantially equal to the thickness of the other eye to permit both sides to be folded down flat upon one of the eyes when the eyes are in folded relation, the folding plane of each side relative to its eye being upwardly from its pivotal connection to the eye toward the pivotal connection of that eye with the bridge piece, each side being made up of sections connected for folding vertically in the normal position of the spectacles to provide for the sections being arranged side by side when turned onto the folded eyes.

10. Folding spectacles including a bridge piece, eyes, pivots uniting the eyes to the bridge piece, the pivotal connection between the bridge piece and eyes compelling the eyes when closed into registry by turning about the pivots to lie in different parallel planes, with the back of one eye substantially in contact with the front of the other eye, sides connected to each eye, the folding plane of each side being upwardly from its pivotal connection toward the bridge, the pivotal support of one side relative to its eye being spaced from that eye a distance exceeding the similar spacing of the other pivotal connection between the side by a distance substantially equaling the thickness of one of the eyes, whereby when the eyes are folded both sides may be turned down flat upon one of the eyes.

11. Folding spectacles including a bridge piece, eyes, pivots uniting the eyes to the bridge piece, the pivotal connection between the bridge piece and eyes compelling the eyes when closed into registry by turning about the pivots to lie in different parallel planes, with the back of one eye substantially in contact with the front of the other eye, sides pivotally connected to the eyes, the pivotal connection of the sides providing for the folding plane of the sides relative to the eye being upwardly toward the bridge piece, the pivotal connection of one side relative to its eye being spaced from that eye a distance substantially equaling the thickness of the other eye.

12. Folding spectacles including a bridge piece, eyes, pivots uniting the eyes to the bridge piece, the pivotal connection between the bridge piece and eyes compelling the eyes when closed into registry by turning about the pivots to lie in different parallel planes, with the back of one eye substantially in contact with the front of the other eye, sides pivotally connected to the eyes, the pivot mounting of each side being inclined with respect to the plane of the eye with which it is connected, the inclination of the pivot compelling the connected side when folded to move in a plane upwardly from its pivotal connection toward the connection of that eye to the bridge, the pivotal mounting of one eye being spaced from the plane of that eye a distance substantially equaling the thickness of the other eye.

13. Folding spectacles including a bridge piece, eyes, pivots uniting the eyes to the bridge piece, the pivotal connection between the bridge piece and eyes compelling the eyes when closed into registry by turning about the pivots to lie in different parallel planes, with the back of one eye substantially in contact with the front of the other eye, sides pivotally connected to the eyes, the pivot mounting of each side being inclined with respect to the plane of the eye with which it is connected, the inclination of the pivot compelling the connected side when folded to move in a plane upwardly from its pivotal connection toward the connection of that eye to the bridge, the pivotal mounting of one eye being spaced from the plane of that eye a distance substantially equaling the thickness of the other eye.

14. Folding spectacles including a bridge piece, eyes pivoted to the bridge piece and foldable relative thereto, with the back of one eye substantially in contact with the front of the other when folded, a side pivoted to each eye, the pivotal mounting of the sides providing for folding both sides substantially flat on one eye when the eyes are folded, the pivots of the sides being set so that the effective pivotal axis is outwardly inclined toward the top so that the side when folded is compelled to overlie that area of the eye to which it is connected which is within a distance not greater than one-half of the length of the bridge piece from the pivotal connection between the particular eye and the bridge piece, the pivotal connections of the eyes to the bridge piece permitting the eyes to fold and reach substantial coincidence before the pivots connecting the sides to the eyes are in contact.

15. Foldable spectacles according to claim 14, wherein the sides are made up of two limbs pivotally connected together.

In testimony whereof I affix my signature.

GERALD HENRY WINGATE.